United States Patent [19]

Adams

[11] 4,313,466
[45] Feb. 2, 1982

[54] VALVE FOR DRINKING FOUNTAINS

[75] Inventor: John F. Adams, Warley, England

[73] Assignees: H. E. Rudge and Company Limited, Birmingham; Associated Builders Merchants Limited, Essex, both of England

[21] Appl. No.: 143,087

[22] Filed: Apr. 23, 1980

[51] Int. Cl.³ .............................................. F16K 1/04
[52] U.S. Cl. ........................... 137/614.17; 137/454.6; 251/122
[58] Field of Search .................... 251/122; 137/454.6, 137/614.16, 614.17

[56] References Cited

U.S. PATENT DOCUMENTS

| | | | |
|---|---|---|---|
| 976,908 | 11/1910 | Payne | 137/454.6 |
| 1,856,664 | 5/1932 | Steen | 137/454.6 |
| 2,159,452 | 5/1939 | Samaras | 137/454.6 |
| 2,561,559 | 7/1951 | Brown | 137/454.6 |
| 3,003,519 | 10/1961 | Homeyer | 137/454.6 |
| 4,064,908 | 12/1977 | Loe | 137/614.17 |
| 4,156,519 | 5/1979 | Janz | 137/454.6 X |

Primary Examiner—Harold W. Weakley
Attorney, Agent, or Firm—Brown, Flick & Peckham

[57] ABSTRACT

A tap, particularly for drinking fountains, has a plunger 17, operated by a toggle 24 and carrying a compressible valve member 19. The valve member 19 cooperates with a seat 16. In order to simplify replacement of the compressible valve member 19, the seat 16 is formed on a receivable carrier 11 which is sealingly and slidably mounted in the valve body and is removable with the plunger when the locking ring 12 is removed.

2 Claims, 1 Drawing Figure

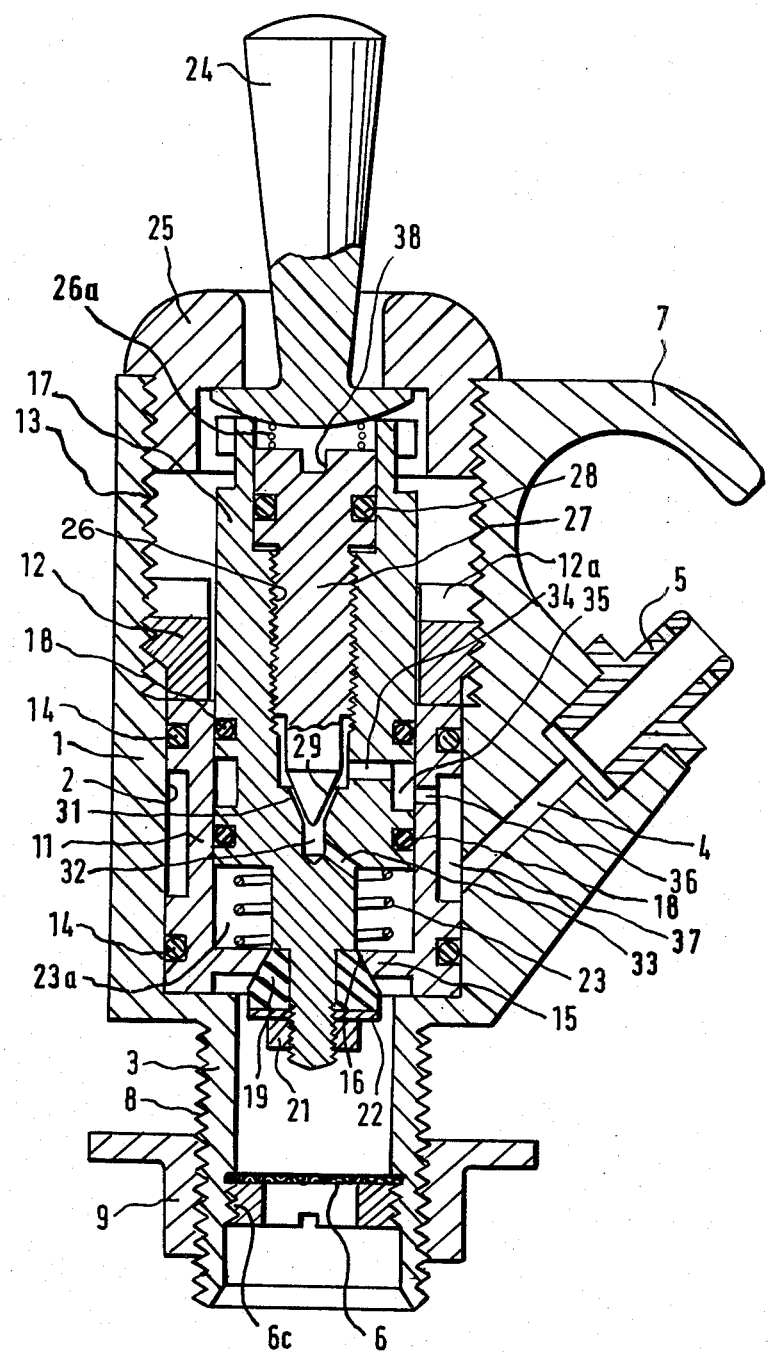

VALVE FOR DRINKING FOUNTAINS

This invention relates to valves and more particularly to valves for use in connecting appliances to water mains and controlling the flow of water to such appliances. A particular appliance for which the valve is designed is a drinking fountain, but it will be appreciated that the invention is not so limited and may be used with other appliances.

One form of valve which is much used includes a plunger extending through a valve seat and carrying a tapered valve member of elastic material engageable with a correspondingly tapered surface on the seat, with the base of the tapered member being on the upstream side of the seat. In such an arrangement, the plunger may be spring loaded to a closed position and opened by depression of the plunger against the action of the spring. The action is easy, and the seating are kept clean by the flow of water over them and the possibility of solid matter, such as particles of scale, collecting on the seating surfaces is minimal.

A drawback of such an arrangement is that when the elastic material wears, as normally happens from time to time, replacement is difficult, in that the valve has to be removed to obtain access to the end of the plunger on the upstream side of the valve seat.

According to the invention there is provided a valve comprising a valve body having an inlet connection and an outlet leading to and from a valve chamber in the body respectively, a valve seat support removably secured to the valve chamber and carrying a tapered valve seat facing towards the inlet and a plunger carrying a tapered valve member of resilient material cooperable with the said valve seat.

By having the valve seat support removably secured in the valve chamber, it will be seen that access to the resilient material tapered valve member will be achieved without the necessity of removing the valve from the external piping. It is preferred that the plunger should itself be slidably received within the valve seat support so that the plunger and valve seat can be removed together. The valve seat support itself may be slidingly and sealingly received within the valve chamber and secured in position by a removable lock ring.

The plunger may extend beyond the valve seat support and be spring loaded outwardly thereof towards an external operating device, such as a toggle or press button. The toggle may be located by a top cover removable to obtain access to the lock ring.

It is also preferred that the valve should include a variable restrictor in a flow path between the valve seat and the outlet, which may constitute a drinking fountain nozzle.

The restrictor may itself be mounted in the plunger and be accessible for adjustment by removal of the top cover.

The invention will be further described with reference to the accompanying single FIGURE of drawing which is a diagrammatic sectional view taken axially through a valve constituting a preferred form of the invention.

The valve illustrated in the drawing includes a valve body 1 having therein a chamber 2 having an inlet duct 3 and an outlet duct 4 leading to a drinking fountain nozzle 5. The nozzle 5 may be threadedly received within the valve body or brazed in position. A inlet filter is shown at 6 held in place by a clamping ring 6c.

The body 1 is also shown as having an overhang 7 adjacent the nozzle 5. The inlet duct 3 is threaded, as shown at 8, on its external surface and is provided with a lock nut 9 for securing to external piping, and particularly a mains water pipe.

Within a cylindrical portion of the chamber 2 there is slidably and sealingly received a carrier 11 which is held in position by means of a lock ring 12 having slots 12a and cooperating with a threaded portion 13 of the chamber adjacent the cylindrical portion. The carrier 11 is sealed against the chamber by means of O-rings 14, e.g. of a nitrile or other non-toxic material. The carrier 11 supports an inwardly directed flange 15 having a tapered valve seat 16 formed thereon and facing down the inlet duct 3.

A plunger 17 is slidably received within the carrier 11, being provided with sealing O-rings 18, also e.g. of nitrile or other non-toxic material, and carries at its inner end a rubber or other flexible elastomer material tapered valve member 19 cooperable with the valve seat 16. The member 19 is held in place by means of a nut 21 and washer 22. The plunger 17 is urged towards a closed position of a valve by means of a spring 23.

At its outer end, the plunger 17 projects beyond the carrier 11 and is arranged to be depressed against the influence of the spring 23 by means of a toggle 24 or other operating member (such as a push button) supported in the valve body 1. As illustrated, the toggle 24 is supported by a top cover 25 threadedly received on the thread 13. A light spring 26a is provided between the toggle 24 and the plunger to give a more positive feel to the operation.

The plunger is provided with an internal thread 26 which receives a restrictor member 27 provided with an O-ring 28 for sealing purposes. At its inner end, the restrictor member 27 is tapered, as shown at 29, to cooperate with a tapered portion 31 of the plunger to form an adjustable restriction which leads into a bore 32 and cross bore 33. This restriction is defined between two metal surfaces. A further cross bore 34 communicates with the hollow interior of the plunger and leads to an annular groove 35 communicating with a cross bore 36 in the carrier 11 and to a further annular groove formed between the carrier 11 and the valve chamber 2. This last mentioned annular groove communicates with the outlet duct 4.

The outer end of the restrictor member 27 carries a transverse slot 38 to engage a screw driver or similar tool for adjustment of the restrictor. It will be seen that access can only be added to the slot 38 when the top cover 25 and toggle 24 are removed, so that tampering with the restrictor member 27 is rendered difficult.

It will be seen that normally the spring 23 urges the plunger 17 to a closed position in which the valve member 19 engages against the seat 16 and water cannot flow. When the toggle is depressed or otherwise operated, the plunger 17 is moved against the action of the spring 23 and the valve opens so that water flows between the valve member 19 and seat 16 into a spring chamber 23a. From chamber 23a water flows through the cross bore 33 and bore 32, past the restrictor and into the cross bore 34 and the annular chamber 35, and then through the cross bore 36 and a further annular chamber 37 and into the outlet duct 4 and the nozzle 5. These chambers 35 and 37 and the various drillings allow the valve to be operated without any initial surge in the flow of water.

In accordance with the invention, it is to be noted that when it is desired to change the elastomeric material member 19, it is not necessary to remove the whole valve from the external plumbing. All that needs to be done is to remove the top cover 25, toggle 24 and spring 24a, and then to remove the lock ring 12, which is shown as being castellated as indicated at 12a for engagement by a suitable tool. By pulling on the plunger at this stage, the plunger and seat carrier 11 can be removed together and access can easily be had to the member 19 and the seat 16. Assembly is in the reverse order, with the castellated lock ring 12 being used to push the carrier right home and lock it in position.

Various modifications may be made within the scope of the invention.

I claim:

1. In a valve comprising a valve body having an inlet connection and an outlet leading to and from a valve chamber in the body respectively, a valve seat in the valve chamber facing towards the inlet, and a plunger carrying a tapered valve member of resilient material cooperable with the valve seat: the improvement comprising a hollow valve seat support slidably and sealingly received in the valve chamber and removably secured therein, said valve seat support carrying the valve seat, said plunger being slidably and sealingly mounted in the valve seat support and provided with a flow passage between the valve seat and said outlet, and a restrictor member extending lengthwise of the plunger and adjustably mounted therein for restricting said flow passage, the restrictor member having adjustment means on the end thereof remote from the restricted flow passage and accessible for adjustment of said member while the plunger and valve seat support remain in operating position in the valve chamber.

2. A valve as claimed in claim 1, in which a removable lock ring is provided inside said chamber to secure the valve seat support in position in the valve chamber.

* * * * *